June 20, 1967  H. R. BILLETER  3,326,334
DOUBLE ACTING SLACK ADJUSTER
Filed Dec. 4, 1964  3 Sheets-Sheet 2

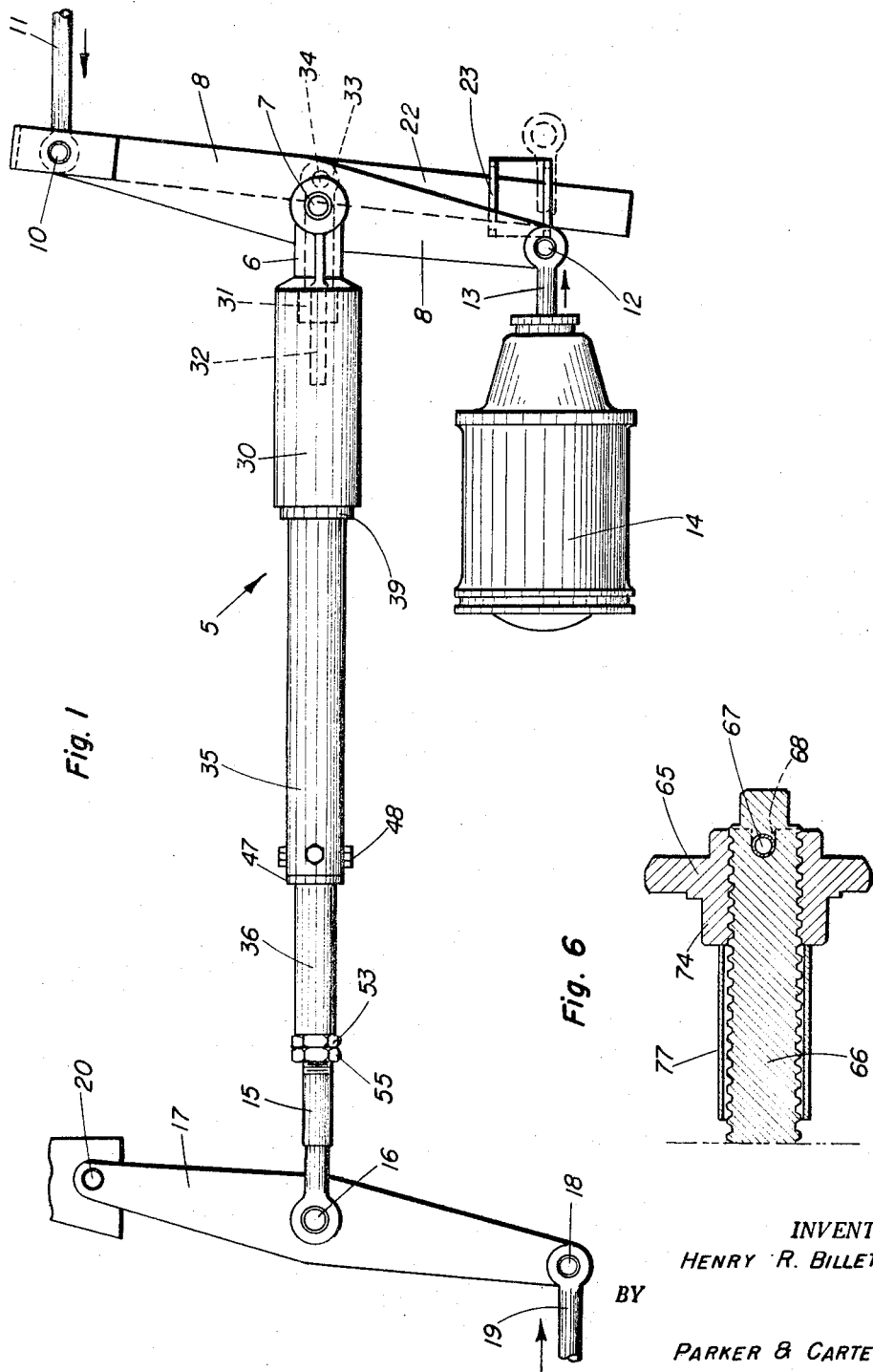

INVENTOR.
HENRY R. BILLETER
BY

PARKER & CARTER
ATTORNEYS

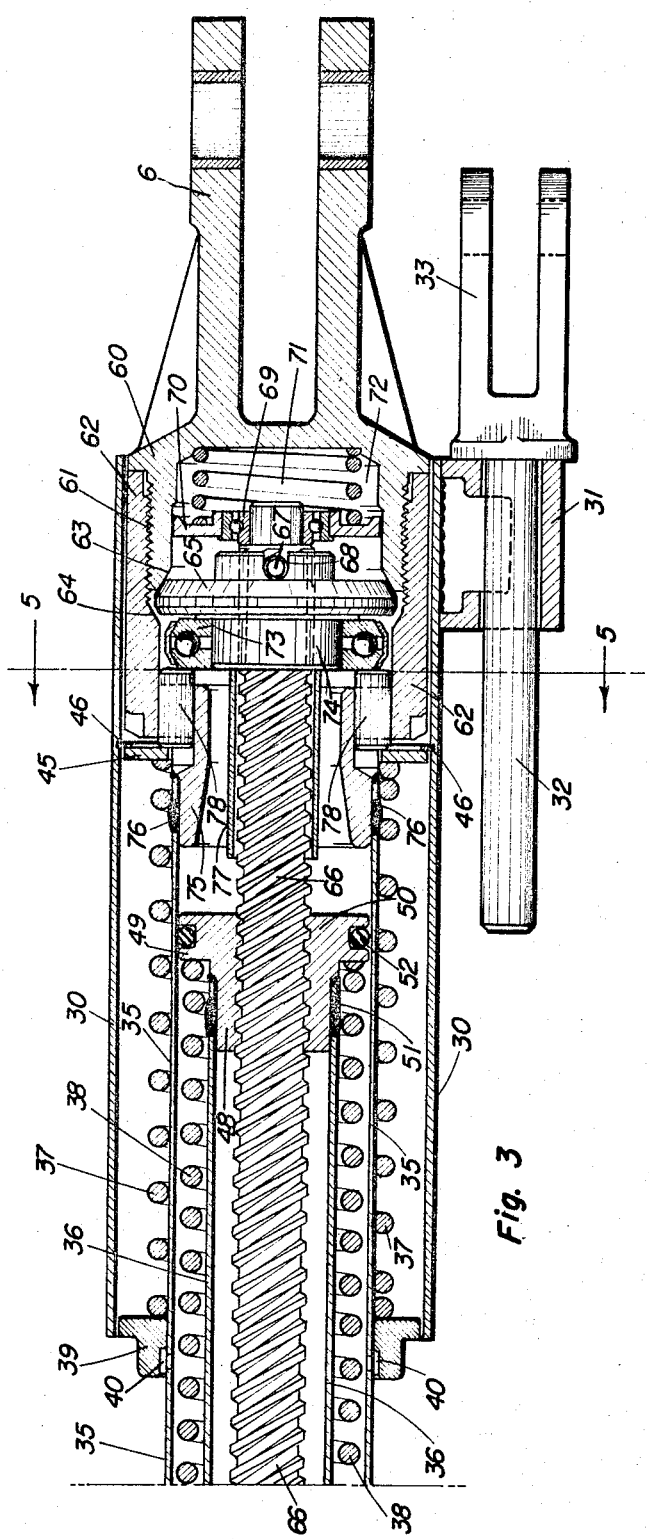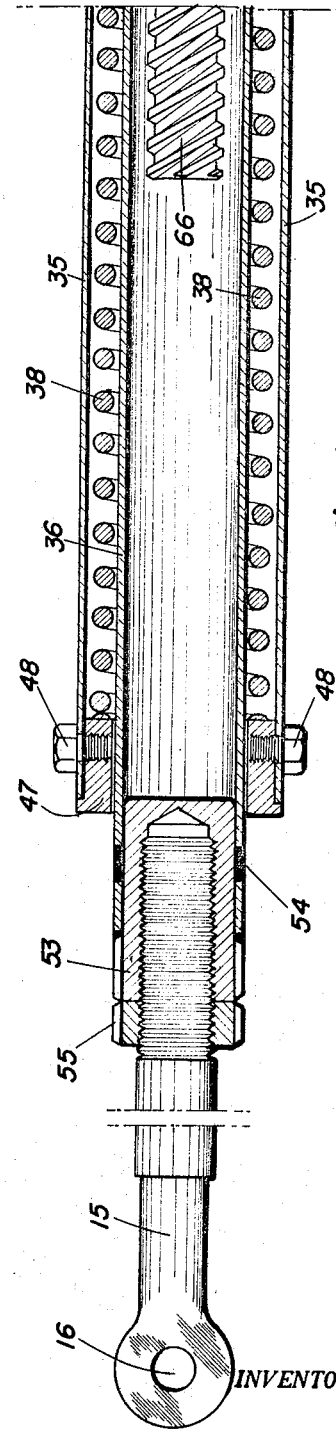

United States Patent Office 3,326,334
Patented June 20, 1967

3,326,334
DOUBLE ACTING SLACK ADJUSTER
Henry R. Billeter, Deerfield, Ill., assignor to Sloan Valve Company, Chicago, Ill., a corporation of Illinois
Filed Dec. 4, 1964, Ser. No. 415,968
19 Claims. (Cl. 188—202)

ABSTRACT OF THE DISCLOSURE

A double-acting slack adjuster comprising telescoping tubes having a threaded rod inside the tubes together with a power spring and a trigger spring. A clutch is attached to the end of the threaded rod and an adjusting nut on the rod is fixed to one of the tubes. On slack let out the trigger spring forces the clutch to unscrew the rod from the nut and on take up the power spring pushes the nut to screw the rod into the nut. The rotation of the threaded rod is stopped by the clutch engaging friction surfaces on one of the tubes.

Cross reference to related application

This invention is related to copending application Ser. No. 464,381, filed June 16, 1965, for "Double Acting Slack Adjuster," by Henry R. Billeter.

This invention relates in general to slack adjusting devices for adjusting slack in the brake rigging of a railway car, and the principal object of the invention is to provide a new and improved double acting slack adjuster for automatically reducing or increasing the amount of slack to maintain optimum brake shoe clearance on the car wheels.

An object of the invention is to design a new and improved automatic slack adjuster which is simpler and more compact in construction, lighter in weight, somewhat shorter in overall length, is dirt and dust-proof, and because of the fewer parts and elements involved, is more reliable and positive in its operation than prior slack adjusters.

Another object is to provide an improved automatic slack adjuster including an adjustable threaded rod with non-self-locking threads and a non-rotatable adjusting nut on the rod, and in which the adjusting rod itself is adapted to rotate within the fixed adjusting nut to vary the effective length of the slack adjuster.

A further object of the invention is to design a new and improved automatic slack adjuster in which the housing and operating elements are in the form of simple tubes which are arranged to telescope axially within one another, and in which undesirable frictional resistances in the operation of the slack adjuster are greatly reduced, and false adjustments, due to shock and vibration under service conditions, are eliminated.

It is a further object to devise a slack adjuster of the type employing an adjusting nut on a threaded rod together with various other operating elements, in which the elements are all arranged in a more compact and closely united manner in order to substantially shorten the overall length of the device as well as to reduce the weight thereof. Formerly the elements of such slack adjusters were arranged in linear or side-by-side order thereby needlessly increasing the extended length of the device.

The foregoing object is attained generally by arranging the connecting elements in the form of tubes so that they telescope within one another axially, and placing the threaded rod inside the tubes together with the main spring and trigger spring. A clutch member is attached to the end of the threaded rod and the adjusting nut is fixed and non-rotatable so that the threaded rod is rotated in the nut to compensate for slack conditions. The threaded adjusting rod is consequently much shorter than that formerly required.

Another object is to provide an automatic two way slack adjuster in which slack is let out by a trigger spring pushing a clutch member to unscrew a threaded rod from a non-rotatable nut, while to take up slack a power spring pushes the nut to screw the threaded rod into the nut.

With the foregoing and other objects in view, the invention consists in the novel construction, combination, and arrangements of parts described and illustrated hereinafter in the accompanying drawings, and pointed out in the appended claims.

Referring to the drawings:

FIGURE 1 is a plan view illustrating a typical brake linkage arrangement on a railway car with the slack adjuster of the invention shown herein;

FIGURE 3 is a cross-sectional view of the right-hand end portion of the slack adjuster mechanism;

FIGURE 4 is a cross-sectional view of the left-hand end portion;

FIGURE 6 is a cross-section showing the clutch member and a portion of the threaded adjusting rod.

Figure 5:
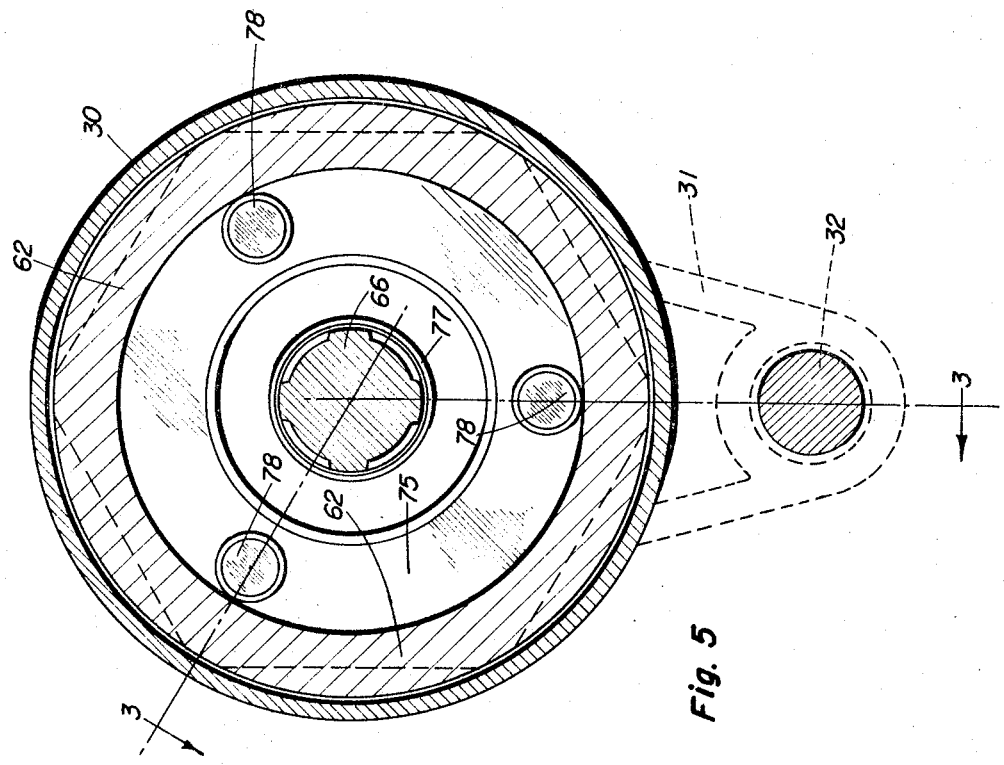
FIGURE 5 is an enlarged section of the device taken along the lines 5—5 of FIGURE 3.

The improved double acting slack adjuster of the invention is adapted for installation in the brake linkage of a railway car in the usual position between the brake cylinder push rod and brake shoes, and commonly as a center rod connection in the brake rigging between the live lever and the dead lever, and when so installed will automatically take up excess slack as the brake shoes wear, and let out slack as when new brake shoes are installed. Thereby a constant predetermined travel of the brake cylinder push rod is maintained within the limits prescribed by standard railroad practice regulations.

The slack adjuster comprises a single unitary structure 5 of cylindrical smooth shape and in which the operating elements are totally enclosed for dust-proof and weather protection. At the right-hand end of the device 5 a clevis 6 is pivotally connected by pivot pin 7 to the central portion of the live lever 8. Referring to the position of the parts in FIGURE 1, the upper end of live lever 8 has a pivot pin 10 for connection with the linkage 11 of the brake rigging leading to the brake shoes (not shown). The bottom end of live lever 8 is pivoted by pin 12 to the end of push rod 13 of the brake cylinder 14, which has a movable piston therein responsive to the usual brake control of the railway car in a brake application to actuate the push rod 13.

The left-hand end of the slack adjuster 5 has a tubular pull rod portion 15 extending from it which is pivoted by pin 16 to the mid-point of dead lever 17. This lever in turn is pivoted at 18 on its lower end to the brake linkage 19 leading to the brake shoes. At its upper end, in FIGURE 1, dead lever 17 is pivoted at 20 to a stationary part of the railway car frame. The live lever 8 further has an actuating lever 22 pivoted at its upper end as shown by pivot pin 10, while at the lower end it is loosely slidable in a bracket 23 supported on the railway car frame. The general arrangement of the foregoing elements is such that outward projection of the push rod 13 by action of the brake cylinder 14 results in the movement of levers 8 and 17, together with the slack adjuster 5 so that braking pull is applied to the linkages 11 and 19 in the direction of the arrows as shown, to produce a service application of the brakes.

The angular distance between the actuating lever 22 and live lever 8 is proportional to the travel of the brake cylinder piston rod 13.

Figure 2:
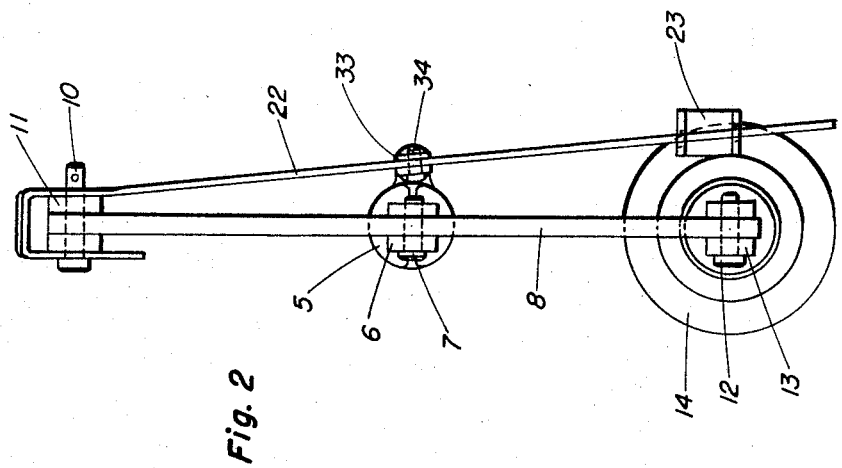
FIGURE 2 is a right-hand end view of FIGURE 1 on a slightly larger scale.

Referring now particularly to FIGURES 3 and 4, with FIGURE 4 being the left hand extended portion of the device, the slack adjuster enclosing means comprises a number of metal telescoping housing tubes protecting the internal mechanism from dust and other debris as well as constituting operating elements in the device, thereby serving multiple purposes. The large outer tube 30, designated the trigger spring housing, is axially shiftable along the unit outside the assembly and at one end has a bracket 31 welded to it supporting a slidable shaft 32 of the trigger clevis 33. The trigger clevis 33 is attached by pivot pin 34 to the approximate mid-part of actuating lever 22, alongside and opposite the pivot pin 7 of the live lever 8, as best seen in FIGURE 2. A second intermediate tube or main spring housing 35 is slidably located between trigger spring tube 30 and an inner third tube defined as the pull rod housing tube 36. The three tubes 30, 35, and 36 are axially slidable relative to one another and under certain operating conditions telescope within one another.

Arranged between tubes 30 and 35 there is a trigger spring 37 while between tubes 35 and 36 there is a power or main spring 38. The left hand end of trigger spring 37 abuts a collar 39 surrounding tube 35, and is slidable within tube 30.

The collar 39 is prevented from moving to the left by a number of studs 40 which lie in recesses formed in the inner diameter of collar 39 and are fitted in holes in the tube 35. The trigger spring 37 and power spring 38 normally hold the collar 39 against the studs 40 in the position shown. The main power spring 38 is compressed sufficiently to exert a minimum force of about 550 lbs. when in operation while the trigger spring 37 will exert a force of about 150 lbs.

At its right hand end trigger spring 37 abuts a washer 45 which in turn is pressed by the spring 37 against a snap ring 46 recessed and supported around the inner wall of trigger tube 30. Trigger spring 37 is thereby confined between collar 39 and washer 45 and will be compressed whenever the trigger tube 30 is shifted or moved to the left. The washer 45 is also forced by spring 37 against the left hand ends of each of the clutch pins 78 to project them forward against bearing 73 and this in turn against clutch 65 as will be more fully pointed out hereinafter.

The pull rod main spring 38 is confined at one end by a collar 47 attached to the main spring tube 35 by bolts 48 and the collar 47 slidable axially with respect to the tube 36. At the right hand end main spring 38 abuts an adjusting nut 50, the shank portion 48 of which fits the inner diameter of pull rod tube 36 and is suitably welded thereto as indicated at 51. The flange portion 49 of adjusting nut 50 is provided with an annular recess in which an O ring 52 is mounted so that the adjusting nut 50 is enabled to axially slide along the inner diameter of tube 35, with some slight friction produced by the O ring 52. The O ring also serves to centralize the nut 50 in the tube 35 and prevent vibration and wear in the parts.

The left hand end of the slack adjuster 5 has the threaded pull rod 15 connected at one end with the associated clevis and pin 16 and dead lever 17, and the other end threaded into the welding tail adapter 53. The adapter 53 is suitably welded at 54 to the end of power tube 36, and a lock nut 55 is provided to lock up the rough adjustment made when the slack adjuster is initially installed in the brake rigging of the railway car.

At the opposite end of the slack adjuster the clevis 6, attached to live lever 8, has a clutch housing 60 formed on it having threaded engagement at 61 with a second clutch housing 62. Both clutch housing 60 and 62 are freely slidable within the outer trigger tube 30. Oppositely disposed tapered clutch surfaces 63 and 64 are formed in clutch housings 60 and 62 respectively, and between them a clutch member or disc 65 is adapted to move back and forth under control of various forces as will be pointed out. Rotatable clutch 65 is secured to one end of a threaded adjusting rod 66 having non-self locking threads throughout its length and which threads have a relatively high helix angle. The clutch 65 is threaded on the end of the threaded adjusting rod 66 and then locked thereon to prevent it from rotating relative to the rod 66, as by the lock pin 67 which passes through the rod 66 and engages oppositely disposed notches 68 formed in the hub portion of the clutch 65, the best seen in FIGURE 6. The clutch 65 is consequently rotated along with the adjusting rod 66 as the rod is screwed back or forth through the adjusting nut 50.

At the forward end of threaded rod 66 and around a reduced diameter of the rod is an anti-friction thrust bearing 69 held in place by a disc 70 against which a lock-up spring 71 presses. The other end of lock-up spring 71 engages the housing 60 and exerts a force of about 60 lbs. against the bearing 69 and rod 66. The foregoing elements are all arranged within a recess 72 formed in the clutch housing 60, so that the spring 71 presses the bearing 69 up against the shouldered end of the threaded rod 66, tending to push the clutch member 65 away from clutch surface 63. A second anti-friction thrust bearing 73 is arranged on the hub 74 of clutch 65 and bears against the left side of the clutch 65. Clutch housing 62 is provided with a reduced shank portion 75 which is inserted in the end of tube 35 and welded to the tube at 76 around the tube's external diameter as shown. The threaded rod 66 extends axially through the shank 75 and has a short tube 77 around the rod which is of a length extending from the clutch hub 74 to a point slightly beyond the end of the shank 75, for a purpose to be defined hereinafter.

Between the clutch housing 62 and its shank portion 75 a series of equally spaced bores are drilled into which a number of clutch pins 78 are slidably supported. These clutch pins 78 have one end in engagement with the sides of clutch bearing 73 and the other end against the washer 45, so that in the brake release condition of the slack adjuster as shown, the trigger spring 37 pressing against washer 45 pushes the clutch pins 78 against the side of thrust bearing 73 which in turn forces the clutch member 65 into engagement with the clutch surface 63. The power main spring 38 pressing against the adjusting nut 50 and thus through the threaded rod 66, also assists in holding the clutch 65 in this lock-up position. This prevents accidental rotation and shifting of the adjusting rod which could be caused by shocks and vibrations, during service operation of the railway car.

For reasons well understood in the art, the maximum stroke of the brake cylinder push rod 13 in response to a braking operation, cannot exceed 12 inches, and an optimum range of 8 inches is selected for the slack adjuster to make its automatic adjustment for any abnormal slack which may be present in the brake rigging or linkage. The various parts of the brake linkage and slack adjuster are illustrated in the drawings as they generally appear in the position in which the brakes are released and the railway car is in running position. The trigger shaft 32 and its clevis 33 however are extended outward a distance from the bracket 31 in the normal position of the slack adjuster.

When a brake application takes place the push rod 13 is forced outward by the air pressure in brake cylinder 14 thereby operating live lever 8 and since the upper end of actuating lever 22 is also pivoted at 10 together with live lever 8, and the lower end actuating lever 22 is slidably restrained by bracket 23, the levers 8 and 22 will separate angularly from each other. The slack adjuster being pivoted to the center portion of live lever 8 by pivot 7, the angular movement of both levers 8 and 22 will cause the center pivot 34 of actuating lever 22 to push trigger clevis 33 and shaft 32 inward after a certain movement of lever 8. This movement is calculated so that the lower end of live lever 8 will be operated by the push rod 13 a distance of about 8 inches before there is any appreciable inward movement of the trigger clevis 33.

In the normal running position the trigger spring 37 exerts a force upon washer 45 and this in turn upon the clutch pins 78 to firmly hold the clutch 65 against clutch surface 63. The power spring 38 is also effective to hold the clutch 65 in this position through the medium of the adjusting nut 50 and threaded rod 66. The slack adjuster is thereby held in locked position and false take-ups are prevented when the device is subjected to vibrations and shocks as would occur during service operations.

Assume that there is an insufficient amount of slack in the brake rigging as would be the result of the installation of new brake shoes for example. It is therefore necessary to introduce some measure of slack into the brake system for proper operation, by increasing the overall length of the slack adjuster in order to prevent dragging of the brake shoes on the wheels and in order to have the proper piston travel. Under the foregoing conditions and upon a brake application, the brake cylinder push rod 13 advances to operate the levers 8 and 17 until a position is reached in which the brake shoes engage the car wheels. During this movement the slack adjuster remains substantially as a solid link between the brake levers as shown in FIGURES 3 and 4 because of the combined tensions in the trigger spring 37 and power spring 38, the clutch 65 being thereby locked against clutch surface 63. Because of insufficient slack the brake shoes make contact with the car wheels before the push rod 13 has traveled the regulation 8 inches in its stroke. As additional continuing stresses are built up in the braking system with the brake shoes engaged, the trigger spring 37 and power spring 38 are compressed with the result that the clutch member 65 is finally freed from its engagement with clutch surface 63 and is therefore conditioned for rotation. Trigger spring 37 however, continues to exert pressure upon the washer 45 and clutch pins 78 and in turn upon clutch 65, which is now freed from restraint, with the result that the adjusting rod 66 is unscrewed from adjusting nut 50 as the slack is let out. This lengthening action continues until the regulation 8-inch travel of push rod 13 has taken place whereupon the actuating lever 22 is effective to cause a shifting of the trigger tube 30 to the left to further compress the trigger spring 37 so that washer 45 relieves the pressure upon clutch pins 78. Lock-up spring 71 is thereby effective to exert its force upon the clutch member 65 to move it immediately into engagement with the left hand clutch surface 64, thereby halting the unscrewing action of rod 66 and locking up the slack adjuster as a solid link in the braking system.

The lack of sufficient slack has now been automatically compensated for and the correction has been made directly during the brake application. The adjusting nut 50 has also been shifted to the left on the rod 66 from its previous position and upon the succeeding brake applications the push rod 13 will now operate to the regulation 8 inch stroke. Responsive to brake release action, the stresses and tensions in the brake rigging are relieved and power spring 38 is thereby effective, due to its stored up energy, to restore the various parts of the slack adjuster back to the normal position as shown. The trigger spring 37 also forces the clutch pins 78 once more against bearing 73 and clutch 65 to hold the clutch tightly in engagement with clutch surface 63.

Assume now that due to wear of the brake shoes and other points in the brake linkage, an excessive amount of slack has accumulated in the system so that the travel of the piston in the brake cylinder 14 would tend to be greater than the desired amount. Under these conditions a brake application results in the usual advancement of the push rod 13 as before and operation of the linkage levers 8 and 17. At this time the slack adjuster also remains as a solid link due to the tensions of springs 37 and 38 so that clutch 65 is frictionally held against clutch surface 63. However, slightly before the push rod 14 has reached its optimum 8-inch stroke, the actuating lever 22 engages trigger bracket 31 and this in turn causes a shifting of the trigger tube 30 in a left hand direction. As a result trigger spring 37 is compressed to relieve the pressure on clutch pins 78 by this spring. Power spring 38 however is still effective to hold the clutch 65 against clutch surface 63 through the medium of the nut 50 and the adjusting rod 66.

When the brake shoes eventually engage the car wheels and tension in the brake linkage mounts, power spring 38 is compressed so that its pressure against clutch 65 is relieved. As a consequence lock-up spring 71 is now effective to force the clutch 65 against clutch surface 64 and lock it up in this position. The slack adjuster is now conditioned as a solid link in the brake rigging as the brakes are firmly in contact with the car wheels and no slack take-up has taken place at this time. The foregoing action in effect only measures the amount of excess slack in the system.

Upon subsequent release of the brakes, pressure is gradually reduced in the brake cylinder 14 until a point is reached at which the power spring 38 can expand and tend to exert its stored up energy through nut 50 and rod 66 against clutch 65 to push the same away from clutch surface 64. Lock-up spring 71 at the same time tends to push against the opposite side of the clutch 65 with the result the clutch is free to rotate between the two clutch surfaces without restraint. This action permits the power spring 38 to force the rigid adjusting nut 50 to the right along the threaded adjusting rod 66 thereby screwing and rotating the rod 66 and spinning the clutch 65 as the brake releasing action continues. The excess slack is accordingly taken up by the adjusting rod 66 during brake release. Subsequently when the position is reached where the actuating lever 22 releases its pressure upon bracket 31 and therefore the trigger tube 30, the trigger spring 37 is effective to release its stored up energy and force clutch pins 78 against clutch 65 to again overcome the tension of lockup spring 71. This action shifts the clutch 65 to the right into engagement with the clutch surface 63 thereby locking up the slack adjuster to its proper length with the excess slack taken up. With the excess slack condition now corrected the next brake application will result in the normal power stroke of the push rod 14.

In summation it may be pointed out generally that in slack let out the clutch is pushed by the trigger spring to pull and unscrew the threaded rod from the fixed nut to lengthen the slack adjuster, while In slack take up the nut is pushed by the power spring along the threaded rod to cause the rod to screw into the nut to shorten up the length of the slack adjuster.

The spacer tube 77 around adjusting rod 66 serves as a stop to keep the adjusting nut 50 from moving too far to the right and engaging the shank 75 to cause lock-up or binding of the clutch 65 against clutch surface 64.

From the foregoing description and operation of the improved slack adjuster it is seen that the proper travel of the brake cylinder piston automatically takes place upon the first brake application and after one or more worn brake shoes have been replaced. When too much slack is in the system due to brake shoe wear the automatic adjustment takes place upon the release of the brakes and bringing the piston back to the proper travel.

While a preferred embodiment of the invention has been illustrated and described herein, it is to be understood that changes and variations may be made by those skilled in the art without departing from the spirit and scope of the appended claims.

What is claimed is:

1. In a double acting automatic slack adjuster for the brake linkage in a railway car, a housing including telescoping tubes each of which is connected to a different portion of said brake linkage, a threaded adjusting rod extending within said tubes, an adjusting nut threaded upon said threaded rod and rigidly attached to one of said tubes to prevent rotation of said adjusting nut on said threaded rod, a clutch member attached to said threaded adjusting rod and axially movable therewith, oppositely disposed clutch surfaces associated with the other of said tubes, said clutch member being arranged between said clutch surfaces and adapted to engage either one of them, means responsive to a condition of slack in said brake linkage for causing said threaded adjusting rod to rotate within said adjusting nut and to rotate said clutch member between said clutch surfaces to thereby alter the position of said threaded adjusting rod with respect to said adjusting nut, and means responsive to engagement of said clutch member with one of said clutch surfaces for stopping the rotation of said threaded adjusting rod.

2. In a double acting automatic slack adjuster for the brake linkage in a railway car, a first housing tube, a second housing tube telescoped within said first tube, a threaded adjusting rod extending axially inside said second tube, an adjusting nut threaded upon said threaded adjusting rod and fastened rigidly to said second tube in non-rotatable relation to said threaded adjusting rod, a clutch housing attached to said first tube having oppositely disposed clutch surfaces thereon, a clutch member attached in non-rotatable relationship to said threaded adjusting rod and positioned between said clutch surfaces, said clutch housing being connected to one portion of said brake linkage and said second tube being connected to another portion of said brake linkage, a power spring arranged between said tubes, and means responsive to a condition of slack in said brake linkage for causing said power spring to force said adjusting nut along said threaded adjusting rod to thereby rotate said rod together with said clutch member and adjust the length of said slack adjuster in said brake linkage, one of said clutch surfaces engaging said clutch member to stop the rotation of said threaded adjusting rod upon correction of said slack condition.

3. In a double acting automatic slack adjuster for the brake linkage in railway cars, including an outer trigger spring housing tube, an inner pull rod tube, and an intermediate main spring housing tube, said tubes being arranged in telescoping relation to one another, a main spring between said pull rod tube and said main spring tube, a trigger spring between said trigger spring housing tube and said main spring housing tube, a threaded adjusting nut threaded on said threaded adjusting rod, said adjusting nut being rigidly attached to said pull rod tube and being non-rotatable with respect to said threaded adjusting rod, a clutch member supported on said threaded adjusting rod, a clutch housing having oppositely disposed clutch surfaces formed therein engageable by said clutch member, means securing said clutch housing to one portion of the brake linkage, means securing said pull rod tube to another portion of said brake linkage, means responsive to a condition of slack in said brake linkage for causing said threaded adjusting rod to rotate in said adjusting nut and said clutch member to correspondingly rotate freely between said clutch surfaces, and means responsive to the correction of said slack condition for stopping the rotation of said adjusting rod.

4. In a double acting automatic slack adjuster for adjusting for variations of slack in the brake linkage of railway cars, an outer housing tube, an inner housing tube telescoped within said outer tube, said inner tube being connected at one end to one portion of said brake linkage, a non-rotatable adjusting nut rigidly supported on the other end of the said inner tube, a clutch housing connected to another portion of said brake linkage and to one end of said outer tube, the other end of said outer tube having a collar therein in slidable relationship with said inner tube, a power spring arranged between said inner and outer tubes and extending from said outer tube collar to said adjusting nut, a rotatable threaded adjusting rod threaded through said adjusting nut and adapted to be rotated by being screwed in or out of said adjusting nut to change the position of said adjusting nut on said adjusting rod in response to variations in the slack conditions whenever a brake application is made, and a clutch member supported on and rotatable with said adjusting rod and in operative relationship with said clutch housing to stop the rotational adjustment of said adjusting rod whenever the slack condition has been corrected.

5. In a double acting automatic slack adjuster for adjusting for slack variations in the brake linkage of railway cars, a first housing tube connected to one portion of said brake linkage, a second housing tube connected to another portion of said brake linkage, an adjusting nut rigidly connected to said first housing tube, a clutch housing connected to said second housing tube, said first and second tubes having slidable relationship with one another, a rotatable threaded adjusting rod threaded through said adjusting nut, a clutch member supported on said adjusting rod in operative relationship to said clutch housing, a power spring arranged between said first and second tubes, means responsive to one condition of slack in said brake linkage for causing said adjusting rod to rotate in said adjusting nut and change the relative position of said adjusting rod and said adjusting nut, means responsive to the correction of said slack condition for engaging said clutch member with said clutch housing to stop the rotation of said adjusting rod, and a third tube connected to another portion of said brake linkage and having operative relationship with said second tube, a spring arranged between said second and third tubes, and means responsive to a different condition of slack in said brake linkage for actuating said third tube to cause said adjusting rod to rotate within said adjusting nut and correct for the slack condition.

6. In a double acting slack adjuster for adjusting for slack variations in the brake linkage of railway cars, a pull rod tube, a main spring tube, and a trigger spring tube, all of said tubes being arranged in telescoping slidable relationship with one another and with the main spring tube located between said other tubes, one end of said pull rod tube being connected to one portion of said brake linkage, an adjusting nut non-rotatably supported in the other end of said pull rod tube, a clutch housing attached to one end of said main spring tube and also being connected to another portion of said brake linkage, the other end of said main spring tube having a collar therein slidable along said pull rod tube, a main spring around said pull rod tube extending between said collar and said adjusting nut, a rotatable adjusting rod threaded through said adjusting nut and being axially located within said pull rod tube, a clutch member rigidly attached to one end of said adjusting rod and rotatable therewith, said clutch member being located within said clutch housing and adapted to engage the clutch housing to stop the rotation of said adjusting rod, means responsive to one condition of slack in said brake linkage for causing said pull rod tube, said trigger spring tube, and said main spring tube to be operated and said adjusting rod to be rotated in one direction within said adjusting nut, and upon correction of the slack condition causing said clutch member to engage said clutch housing to stop the rotation of said adjusting rod, and means responsive to another condition of slack for causing said trigger spring tube, said pull rod tube, and said main spring tube to be activated and said adjusting rod to be rotated in another direction until the slack condition has been corrected and said clutch member has engaged said clutch housing to stop the rotation of said adjusting rod.

7. In a double acting automatic slack adjuster for adjusting for slack variation in the brake linkage of railway cars, a pull rod tube, a main spring tube, and a trigger spring tube, all of said tubes being arranged in telescopic slidable relationship with one another and with said main spring tube located between said other tubes, one end of said pull rod tube being connected to one portion of said brake linkage, an adjusting nut non-rotatably supported on the other end of said pull rod tube and being slidable within said main spring tube, a clutch housing attached to one end of said main spring tube and being connected to another portion of said brake linkage, the opposite end of said main spring tube having a collar thereon slidable along said pull rod tube, a main spring around said pull rod tube extending between said collar and said adjusting nut, a trigger spring around said main spring tube extending from one end of said trigger spring tube to a collar on said main spring tube, a threaded adjusting rod rotatable through said adjusting nut and being axially displaceable within said pull rod tube, a clutch member supported on one end of said adjusting rod and rotatable therewith, said clutch member being located within said clutch housing and adapted to engage said clutch housing to stop the rotation of said adjusting rod, and means responsive to the presence of insufficient slack in said brake linkage for operating all of said tubes relative to one another to cause said adjusting rod to rotate within said adjusting nut in one direction and thereby let out slack, said clutch member engaging said clutch housing to stop further rotation of said adjusting rod when the slack condition has been corrected, and means responsive to the presence of excess slack in said brake linkage for operating all of said tubes relative to one another to cause said adjusting rod to rotate in the other direction and thereby take up excess slack, said clutch member engaging said clutch housing to stop the further rotation of said adjusting rod when the slack has been taken up and corrected.

8. In a double acting automatic slack adjuster for the brake linkage in a railway car, a pull rod tube, a main spring tube, and a trigger tube, said main spring tube being connected to one portion of said brake linkage and said pull rod tube to another portion of said brake linkage, a main spring arranged between said pull rod tube and said main spring tube, an adjusting nut non-rotatably attached to said pull rod tube, a rotatable adjusting rod threaded through said adjusting nut, a clutch member fastened to said adjusting rod and rotatable thereby, clutch surfaces on said main spring tube arranged on each side of said clutch member, said clutch member adapted to engage either of said clutch surfaces to stop the rotation of said clutch member and said adjusting rod, said main spring normally tending to hold said clutch member in engagement with one of said clutch surfaces, a lock-up spring arranged on one end of said adjusting rod tending to force said clutch member into engagement with the other of said clutch surfaces, a trigger spring between said main spring tube and said trigger tube, and means effective responsive to an excess of slack in said brake linkage for causing said trigger tube to disengage said clutch member from one of said clutch surfaces and permit said clutch member and said adjusting rod to rotate and change the relative position of said adjusting rod on said adjusting nut to thereby take up the excess slack.

9. In a double acting automatic slack adjuster for the brake linkage in a railway car, a pull rod tube and a main spring tube, each connected to a different portion of said brake linkage, an adjusting nut fastened to said pull rod tube, an adjusting rod threaded through said adjusting nut, said adjusting rod adapted to be rotated by movement of said adjusting nut to vary the length of said slack adjuster in response to variations in the slack condition of said brake linkage, a first spring means between said pull rod tube and said main spring tube, a clutch member fastened to said adjusting rod and rotatable therewith, clutch surfaces arranged in operative relationship with said clutch member and connected to said main spring tube, said clutch surfaces adapted to stop rotation of said adjusting rod whenever said clutch element engages one of said clutch surfaces, a second spring means tending to force said clutch member away from one of said clutch surfaces, a trigger tube adapted to be operated in response to a condition for excess slack in said brake linkage, and a trigger spring arranged between said trigger tube and said main spring tube and effective to normally force said clutch member against said clutch surface.

10. In a double acting automatic slack adjuster for the brake linkage of a railway car, a housing connected to the brake linkage, an adjusting nut in said housing, an adjusting rod threaded through said adjusting nut and adapted to be rotated to vary its position with respect to said adjusting nut in response to variations in the slack condition of said brake linkage, a clutch member fastened to said adjusting rod and rotatable therewith, clutch surfaces in said housing adapted to be engaged by said clutch member to stop the rotation of said adjusting rod, a trigger member on said housing adapted to be operated responsive to an abnormal slack condition in said brake linkage, spring means for normally holding said clutch member in engagement with one of said clutch surfaces, clutch pins engaging said clutch member, and means connecting said trigger member with said clutch pins to overcome said spring means and release said clutch member from said clutch surface upon operation of said trigger member.

11. In a double acting automatic slack adjuster for the brake linkage of railway cars, a housing connected to the brake linkage, a non-rotatable adjusting nut in said housing and a rotatable adjusting rod threaded through said adjusting nut, said adjusting rod adapted to be rotated and screwed in or out of said adjusting nut to vary its position with respect to said adjusting nut in response to movements of said housing caused by variations in the slack condition of said brake linkage, a clutch member fastened to said adjusting rod and rotatable therewith, clutch surfaces on said housing adapted to be engaged by said clutch member to stop the rotation of said adjusting rod, a trigger member operated in response to an abnormal slack condition in said brake linkage, means connecting said trigger member with said clutch member and for holding said clutch member in engagement with said clutch surfaces, and means responsive to said abnormal slack condition for operating said trigger member to disengage said clutch member from said clutch surfaces and permit rotation of said adjusting rod to screw it in or out of said adjusting nut to correct the slack condition.

12. The slack adjuster as defined in claim 11, in which the means connecting the trigger member with the clutch member consists of a series of clutch pins contacting said clutch member, and a trigger plate on said trigger member forced by a trigger spring into engagement with said clutch pins.

13. The slack adjuster as defined in claim 11, in which the means connecting the trigger member with the clutch member consists of a series of clutch pins in engagement with the clutch member, and a trigger plate on said trigger member forced by a trigger spring into engagement with said clutch pins, and wherein operation of said trigger tube releases the pressure of said clutch pins on said clutch member to permit rotation of said clutch member and said adjusting rod.

14. The slack adjuster as defined in claim 11, in which the adjusting nut is provided with a flange portion having an O-ring therein slidable along the internal diameter of the main spring tube to cushion the adjusting nut and adjusting rod from vibration and shock during movements of the railway car.

15. The slack adjuster as defined in claim 11, in which the adjusting nut and the clutch member are spaced apart on said adjusting rod, and there is a sleeve around said adjusting rod between the adjusting nut and clutch member serving as a stop for the adjusting nut to prevent lock-up of said adjusting nut.

16. In a double acting automatic slack adjuster for the brake linkage of a railway car, a pull rod tube and a main spring tube each connected to different portions of said brake linkage and with the pull rod tube arranged within said main spring tube, a power spring around said pull rod tube and extending between opposite ends of said tubes, an adjusting nut non-rotatably fastened to one end of said pull rod tube and having a flange portion slidable within said main spring tube whenever said tubes are actuated relative to one another in response to variations in the slack condition of said brake linkage, an adjusting rod arranged axially of said pull rod tube and threaded through said adjusting nut, said adjusting rod rotatable to vary its relative position on said adjusting nut when said tubes are actuated, and friction means on said adjusting nut flange engaging said main spring tube for preventing vibration and shock to said adjusting rod and nut during operation of said railway car.

17. In double acting slack adjuster for the brake linkage of a railway car, a non-rotatable adjusting nut associated with one portion of said brake linkage and in non-rotatable relationship therewith, a rotatable rod in non-self locking screw threaded engagement with said adjusting nut, means including a trigger spring associated with another portion of said brake linkage automatically operated responsive to a certain slack condition in said brake linkage for causing said rotatable rod to be rotated and unscrewed from said adjusting nut, means including a power spring automatically operated responsive to a different slack condition in said brake linkage for causing said rotatable rod to be rotated and screwed into said adjusting nut, and means responsive to the correction of said slack conditions for automatically stopping the rotation of said rotatable rod.

18. In an automatic double acting slack adjuster for the brake linkage of a railway car, a first member connected to one portion of said brake linkage, a second member connected to another portion of said brake linkage, a non-rotatable adjusting nut fixedly supported on said second member, a rotatable rod in non-self locking screw threaded engagement with said adjusting nut, means including a trigger spring on said second member automatically operated responsive to a lack of slack in said brake linkage for causing said rotatable rod to be rotated and thereby unscrewed from said adjusting nut to lengthen the slack adjuster, means including a power spring automatically operated responsive to an excess of slack in said brake linkage for causing said adjusting nut to be forced along said rotatable rod to rotate said rotatable rod and thereby screw the same into said adjusting nut to shorten the slack adjuster, and cooperating clutch means on said first member and on said rotatable rod operative for automatically stopping the rotation of said rotatable rod responsive to the correction of either of said slack conditions.

19. In an automatic double acting slack adjuster for the brake linkage of a railway car, a first tubular member connected to one portion of said brake linkage, a second tubular member connected to another portion of said brake linkage, a non-rotatable adjusting nut fixedly supported on said second tubular member, a rotatable threaded rod extending within both of said tubular members and in non-self locking engagement with said adjusting nut, a clutch member operatively associated with said first tubular member and fixedly supported on said rotatable rod, said clutch member being rotatable with said rotatable rod, means including a trigger spring automatically operated responsive to a lack of slack in said brake linkage for causing said clutch member to be rotated and said rotatable rod to be rotated in one direction and unscrewed from said adjusting nut to lengthen the slack adjuster, means including a power spring automatically operated responsive to excessive slack in said brake linkage for causing said adjusting nut to be forced along said rotatable rod to rotate the same in a different direction and cause the rotatable rod to be screwed into said adjusting nut to shorten the slack adjuster, and clutch surfaces on said first tubular member adapted to be engaged by said clutch member for automatically stopping the rotation of said rotatable rod when either slack condition has been corrected.

References Cited
UNITED STATES PATENTS

| | | | |
|---|---|---|---|
| 1,817,081 | 8/1931 | Jonas. | |
| 1,837,473 | 12/1931 | Neveu | 188—202 |
| 1,983,897 | 12/1934 | Browall | 188—196 |

DUANE A. REGER, *Primary Examiner.*